United States Patent [19]

Faulstroh

[11] Patent Number: 5,193,848
[45] Date of Patent: Mar. 16, 1993

[54] ADJUSTABLE MOTOR VEHICLE SAFETY STEERING COLUMN

[75] Inventor: Hans-Joachim Faulstroh, Wimsheim, Fed. Rep. of Germany

[73] Assignee: Dr. Ing. h.c.F. Porsche AG, Fed. Rep. of Germany

[21] Appl. No.: 764,907

[22] Filed: Sep. 24, 1991

[30] Foreign Application Priority Data

Sep. 26, 1990 [DE] Fed. Rep. of Germany ....... 4030405

[51] Int. Cl.$^5$ ............................................. B62D 1/19
[52] U.S. Cl. .................................... 280/775; 200/777; 74/493; 74/500
[58] Field of Search ................. 280/775, 777; 74/493, 74/500

[56] References Cited

U.S. PATENT DOCUMENTS 4,531,619 7/1985 Eckels ................................. 280/777

FOREIGN PATENT DOCUMENTS 1630847 10/1971 Fed. Rep. of Germany .
3318935 12/1984 Fed. Rep. of Germany .
2633579 1/1990 France .

OTHER PUBLICATIONS

One page European Search Report.

Primary Examiner—Kenneth R. Rice
Attorney, Agent, or Firm—Evenson, Wands, Edwards, Lenahan & McKeown

[57] ABSTRACT

A motor vehicle adjustable safety steering column for a motor vehicle, including a column with an air bag, has a steering spindle which can be pushed together in a telescope-type manner and is disposed in outer casing tube parts. The steering column are supported by way of a deformation element. The deformation element comprises a first outer casing tube part which, on the end side, is supported on an inner casing tube to envelope the deformation element. This casing tube has a toothed rack into which a pinion of an adjusting device engages for axial displacement of the steering column. Thus, a steering column of compact construction can be both axially adjustable and have an energy-absorbing effect.

20 Claims, 4 Drawing Sheets

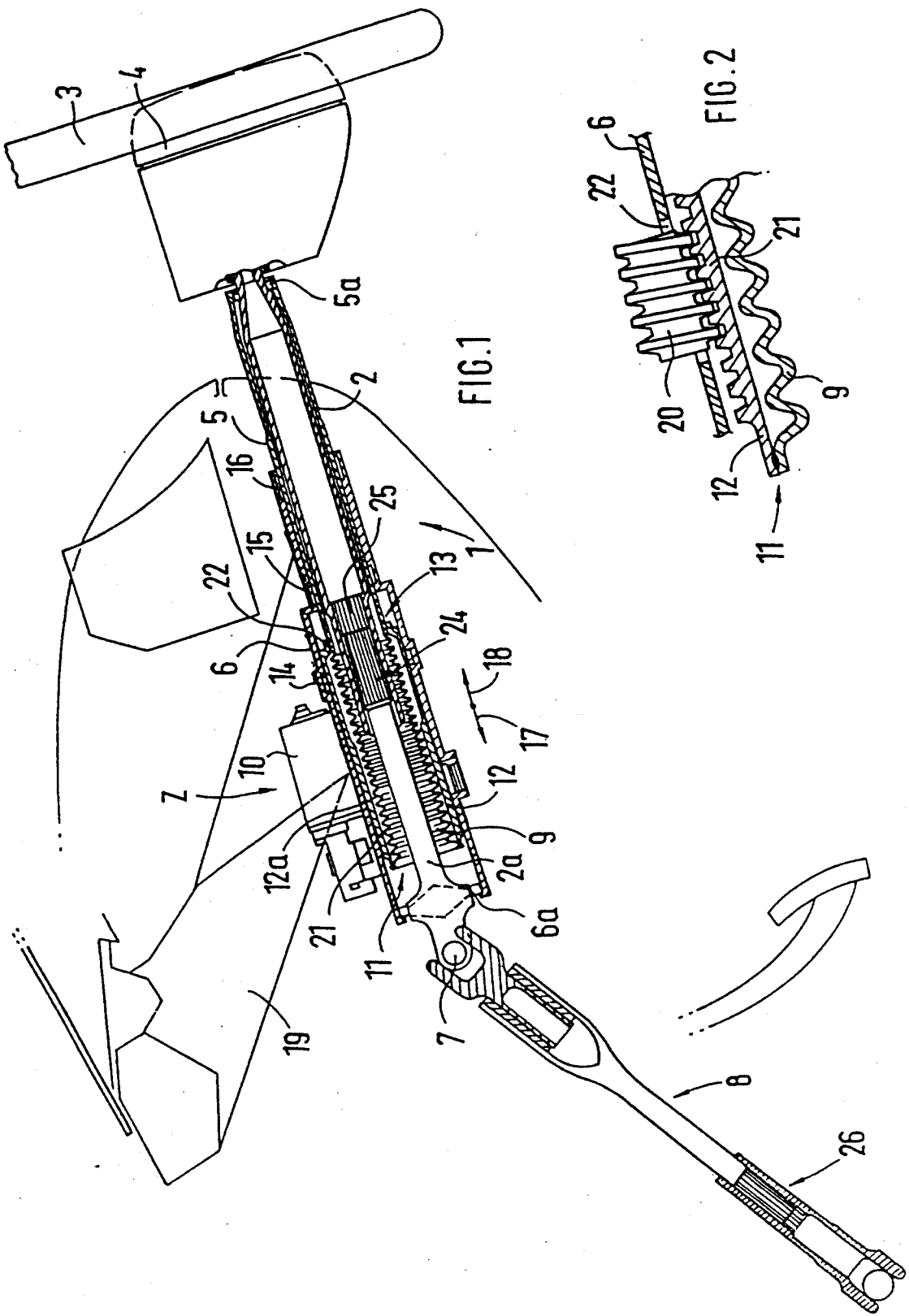

ADJUSTABLE MOTOR VEHICLE SAFETY STEERING COLUMN

BACKGROUND AND SUMMARY OF THE INVENTION

The present invention relates to an adjustable safety steering column for a motor vehicle and, more particularly, to a column with a telescopable steering spindle disposed in outer casing parts and supported by a deformation element.

German Patent Document DE-PS 33 18 935 shows an axially adjustable steering column for a motor vehicle in which a toothed rack is connected with an inner casing tube and a pinion of an adjusting motor engages in the toothed rack. As a result, the casing tube part with the connected steering spindle is axially displaced. An energy-absorbing device is not provided in the case of this steering column. Another steering column is shown in German Patent Document DE-AS 16 30 847 and is constructed as a safety steering column with a deformation element between a casing tube and a bodyside support. This deformation element deforms in the case of a crash in which case the divided steering spindle telescopes. An axial adjustment of the steering column for the purpose of adapting it to the driver is not possible with this steering column.

It is an object of the present invention to provide an adjustable steering column which complies with the safety requirements in the case of a crash.

This object has been achieved in accordance with the present invention by configuring a first outer casing tube part as a deformation element supported, on an end side, on an inner casing tube surrounding the deformation element. The inner casing tube has a toothed rack into which a pinion of an adjusting device engages for axial displacement of the steering column.

One of the principal advantages achieved by the invention is that a steering column of a compact construction is provided which is axially adjustable and, at the same time, absorbs energy.

In addition to the axial displacement of the steering column, the adjusting device also permits a holding-fast of the deformation element in the case of a crash. Since a direct linking to the vehicle body does not exist, the steering column is supported by way of a pinion of the adjusting device which engages in a toothed rack on the deformation element.

In one embodiment of the present invention a first outer casing tube part, on which the steering spindle is disposed, is integrally connected with the deformation element which corresponds approximately to the outside diameter of the casing tube part. Following the first outer casing tube part, an inner casing tube extends which encloses the deformation element and to which the deformation element is fastened on the end side. This type of connection of the deformation element with the inner casing tube permits, by way of a toothed rack connected with this part and by way of an engaging pinion, the axial displacement of the steering column as well as an arresting of the steering column.

Preferably the inner casing tube is supported with its end facing away from the fastening point to the deformation element on the first outer casing tube part and may be fastened by way of shearable plastic pins. Thus, for the axial displacement, an introduction of force may also take place by way of this connected end and, in the case of a crash, a corresponding coordination takes place for absorbing energy.

The deformation element is guided inside the cylinder of the inner casing tube and on the steering spindle. That is, the deformation element rests against the inner circumferential surface and on the outer surface so that no buckling of the deformation element can take place in the case of a crash as well as in the case of an axial displacement of the steering column.

The deformation element preferably comprises a corrugated tube and is constructed in one piece with the casing tube part in that the end of the casing tube part is upset correspondingly in a special process. Also within the scope of the present invention is a corrugated tube which is separate from the casing tube part as well as corresponding deformation elements which have an energy-absorbing effect.

The steering spindle has a divided construction in the area of the inside casing tube and the parts are displaceably connected with one another by way of longitudinal toothing. Another division of a connecting steering spindle is provided in the area between a steering gear and a joint.

BRIEF DESCRIPTION OF THE DRAWINGS

These and other objects, features and advantages of the invention will become more readily apparent from the following detailed description of a presently preferred embodiment when taken in conjunction with the accompanying drawings wherein:

FIG. 1 is a longitudinal sectional view of a safety steering column in accordance with the present invention;

FIG. 2 is a sectional view of a detail (designated by the arrow Z in FIG. 1) of an adjusting device;

DETAILED DESCRIPTION OF THE DRAWINGS

Figure 3:
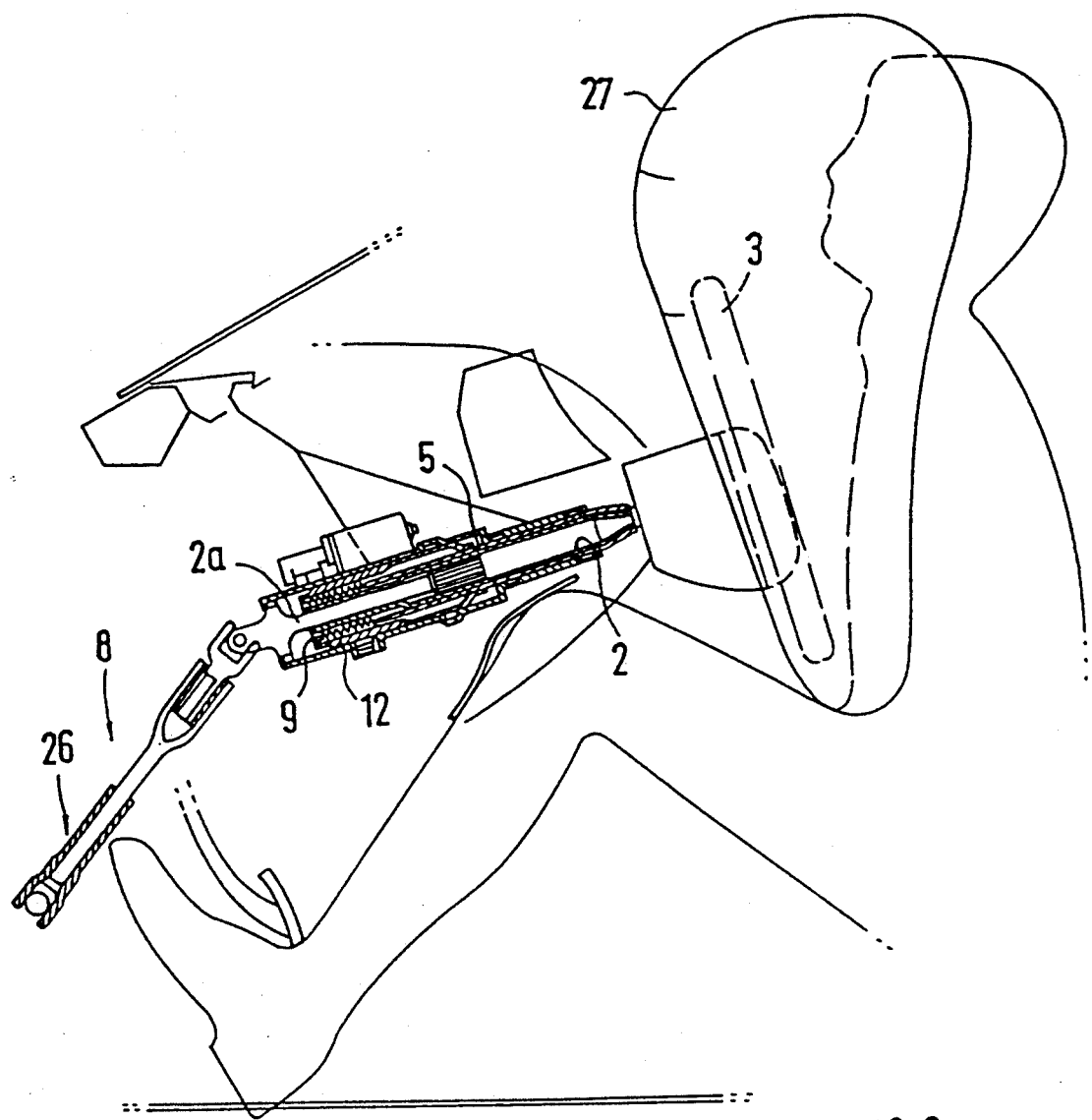
FIG. 3 is a representation of the steering column of FIG. 1 after a crash.

The safety steering column designated generally by the numeral 1 comprises a steering spindle composed of two steering spindle parts 2, 2a and is connected with a steering wheel 3 with which an air bag 4 in a housing is associated in a known way. The steering spindle 2, 2a is arranged within outer casing tube parts 5, 6 in bearings 5a and 6a and, by way of a joint 7, is connected with another steering spindle 8 which leads to the steering gear. A deformation element 9 is arranged inside the outer casing tube parts 5, 6 and has an energy-absorbing effect during a crash. An adjusting device 10 allows the steering column to be axially displaced for the purpose of being driver adjustment.

The first outer casing tube part 5 is connected with and has the same axis as the deformation element 9, and corresponds approximately to its outside diameter. The deformation element 9 is preferably constructed as a corrugated tube, although it may also consist of a perforated tube or of another energy-absorbing component. At its free end 11, the element 9 is connected with and enveloped by an inner casing tube 12 which extends to the free end 13 of the first outer casing tube part 5. Together with the inner casing tube 12, the element 9 is disposed between slide bearings 14, 15 and 16 of the second outer casing tube part 6 so that the deformation element can be slid in the direction of the arrows 17 and 18.

The second outer casing tube part 6 is supported on the vehicle body 19 and carries the adjusting device 10. This adjusting device 10 comprises a motor which drives a pinion 20 (FIG. 2) which engages in a toothed rack 21 arranged on the inner casing tube 12 and extending over a distance which corresponds to the desired axial displacement path. The second outer casing tube part 6 has an opening 22 in which the pinion 20 is arranged.

Axial adjustment of the steering column 1 via the pinion 20 is carried out by the connection between the deformation element 9 and the inner casing tube 12 such that the casing tube 12 as well as the first outer casing tube part 5 with the deformation element 9 is displaced inside the second outer casing tube part 6. The inner casing tube 12, by means of its end facing the free end 13 of the first outer casing tube part 5, is supported thereon and can be connected with the casing tube part 5 by shearable plastic pins 22. The deformation element 9 is guided, in an upper region on the steering spindle 2 and, in a lower region, inside the inner casing tube 12 along the inner circumferential surface 12a.

In the region of the deformation element 9, the two parts 2 and 2a of the steering spindle have a displacement connection 24 such that the steering spindle part 2a, by way of a toothing 25, can be pushed into the steering spindle part 2. Another identical displacement connection 26 is provided in the connecting steering spindle 8.

Figure 3A:
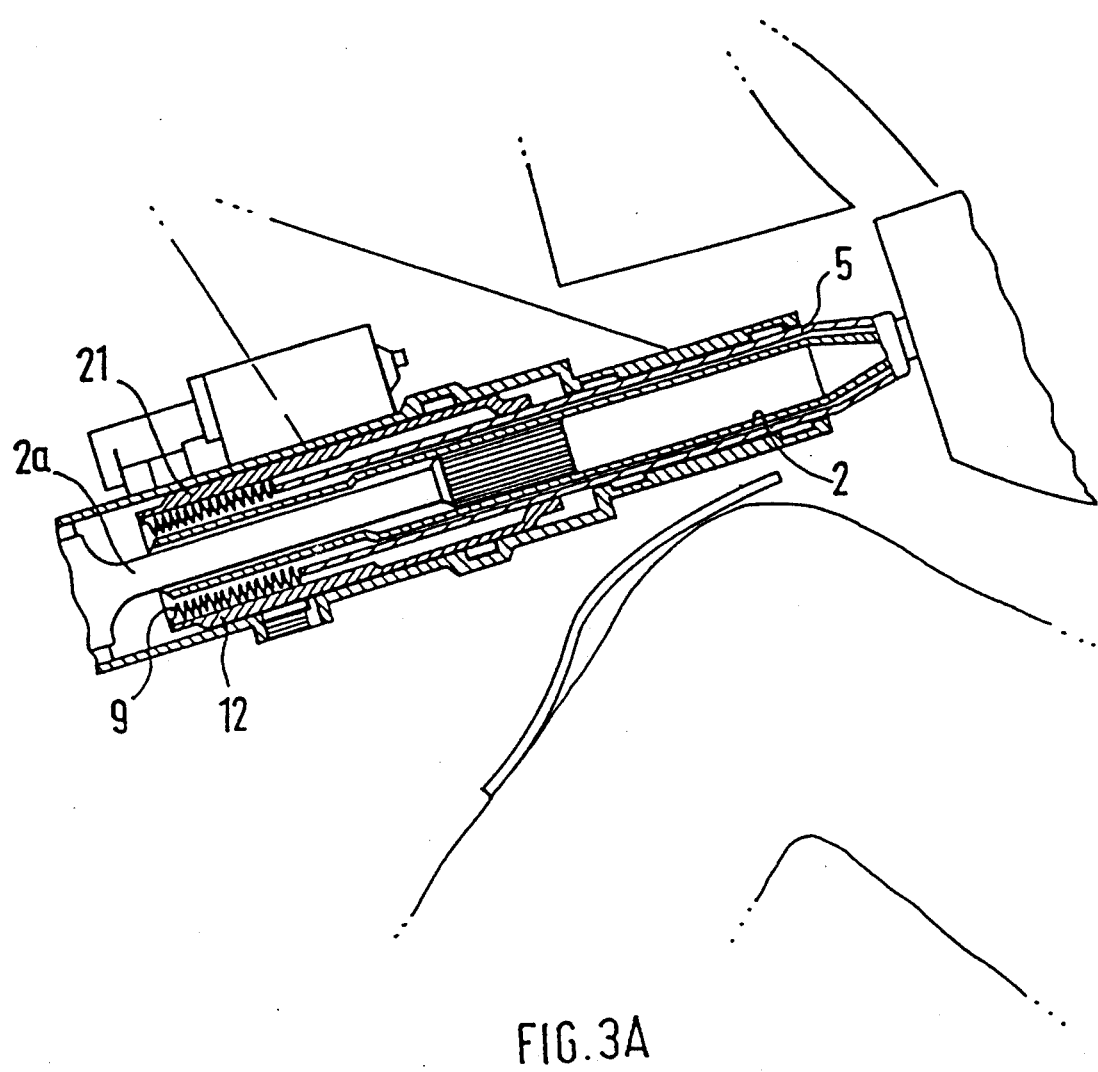
FIG. 3A is an enlarged representation of the steering column shown in FIG. 3.

As shown in greater detail in FIGS. 3 and 3A, an air bag 27 of the air bag system is activated in the case of a crash, and the deformation element 9 is compressed in an energy-absorbing manner. In this situation, the first outer casing tube part 5 is displaced with respect to the second outer casing tube part 6 and to the inner casing tube 12. This inner casing tube 12 is held fast by way of the pinion 20 so that an absorption of force is possible for the purpose of deforming the element 9. During the deformation process, the steering shaft parts 2, 2a inside the displacement connection 24 and the steering shaft part 8 inside the additional displacement connection 26 are displaced inside one another.

Figure 4:
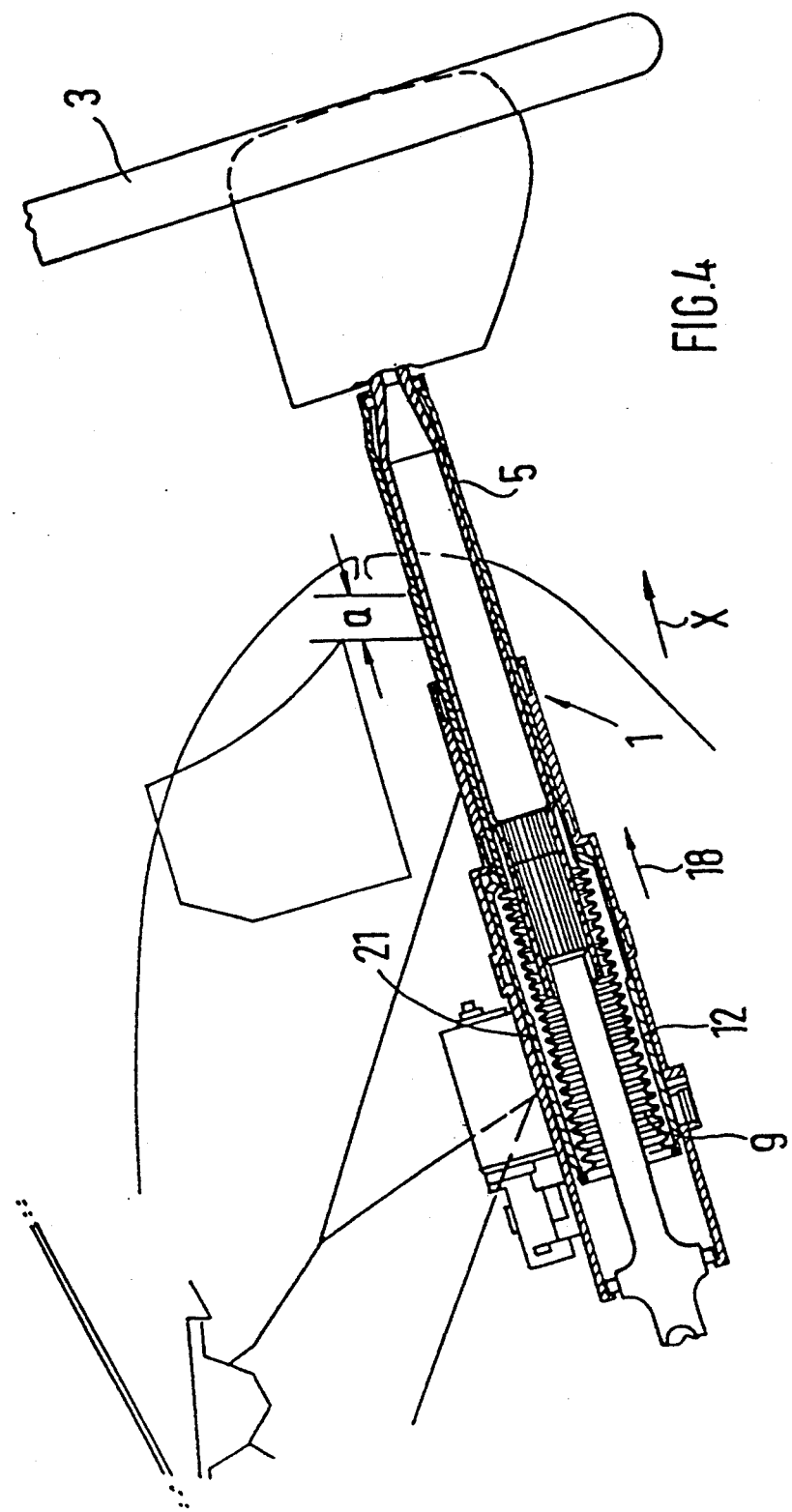
FIG. 4 is a sectional view of the steering column adjusted in the direction of the arrow X.

FIG. 4 is a detailed representation showing an adjustment of the steering column 1 relative to the position shown in FIG. 1. As a result of the rotation of the pinion 20 in the profile of the toothed rack 21 on the inside casing tube 12, a displacement in the direction of, for example, the arrow 18 takes place, in which instance, by way of the connection with the deformation element 9 and the following first outer casing tube part 5, the steering wheel 3 is displaced by a maximum amount a out of a center position.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An adjustable safety steering column for a motor vehicle, comprising a telescopable steering spindle disposed in outer casing tube parts and supported by a deformation element, wherein a first outer casing tue part comprising one of the outer casing tube parts is guided between a steering spindle and a second outer casing tube part comprising another of the outer casing tubing parts and, on a free end of the first outer casing tube part facing away from the steering wheel, the first outer casing tube part is connected with the deformation element which is supported at an end face of an inner casing tube surrounding the deformation element, said third casing tube having a toothed rack into which a pinion of an adjusting device is arranged to engage for axial displacement of the steering column.

2. The adjustable safety steering column according to claim 1, wherein the first outer casing tube part is one piece with the deformation element and has a free end fastened to the inner casing tube.

3. The adjustable safety steering column according to claim 1, wherein the first outer casing tube part is axially slidably between slide bearings held inside the second one of the outer casing tube parts.

4. The adjustable safety steering column according to claim 3, wherein the first outer casing tube part is one piece with the deformation element and has a free end fastened to the inner casing tube.

5. The adjustable safety steering column according to claim 1, wherein the adjusting device is operatively held on the second one of the outer casing tube parts, and the pinion penetrates an opening of the second outer casing part and engages in a profile of the toothed rack.

6. The adjustable safety steering column according to claim 5, wherein the first outer casing tube part is one piece with the deformation element and has a free end fastened to the inner casing tube.

7. The adjustable safety steering column according to claim 6, wherein the first outer casing tube part is axially slidable between slide bearings held inside the second one of the outer casing tube parts.

8. The adjustable safety steering column according to claim 1, wherein axial displacement of the inner casing tube part is prevented by the operative connection of the pinion and the toothed rack, and the inner casing tube forms an abutment for the deformation element.

9. The adjustable safety steering column according to claim 8, wherein the first outer casing tube part is one piece with the deformation element and has a free end fastened to the inner casing tube.

10. The adjustable safety steering column according to claim 9, wherein the first outer casing tube part is axially slidable between slide bearings held inside the second one of the outer casing tube parts.

11. The adjustable safety steering column according to claim 1, wherein the inner casing tube has an end facing away from the deformation element, and is guided on the first outer casing tube part.

12. The adjustable safety steering column according to claim 11, wherein the first outer casing tube part is one piece with the deformation element and has a free end fastened to the inner casing tube.

13. The adjustable safety steering column according to claim 1, wherein the inner casing tube has a free end facing away from the deformation element, and is operatively connected to the first outer casing tube part by at least one shearable plastic pin.

14. The adjustable safety steering column according to claim 13, wherein the first outer casing tube part is one piece with the deformation element and has a free end fastened to the inner casing tube.

15. The adjustable safety steering column according to claim 1, wherein the deformation element is a corrugated tube.

16. The adjustable safety steering column according to claim 15, wherein the first outer casing tube part is one piece with the deformation element and has a free end fastened to the inner casing tube.

17. The adjustable safety steering column according to claim 1, a lower area of the deformation element is arranged coaxially inside the inner casing tube and is configured to be guided in an approximately resting manner to an inner circumferential surface thereof, with an upper area of the deformation element being held on the steering spindle.

18. The adjustable safety steering column according to claim 17, wherein the first outer casing tube part is one piece with the deformation element and has a free end fastened to the inner casing tube.

19. The adjustable safety steering column according to claim 17, wherein a part of the steering spindle is operatively held on the second outer casing tube part by a bearing, another part of the steering spindle is operatively connected via a bearing with the first outer casing tube part, and the steering spindle parts, are operatively held in a connection area by toothing, so as to be longitudinally displaceable with respect to one another.

20. The adjustable safety steering column according to claim 19, wherein the first outer casing tube part is one piece with the deformation element and has a free end fastened to the inner casing tube.

* * * * *